T. L. & J. A. RINEY.
LAMP ATTACHMENT FOR VEHICLES.
APPLICATION FILED MAY 15, 1909.

972,573.

Patented Oct. 11, 1910.

WITNESSES

INVENTORS
Thomas L. Riney
John A. Riney
BY
ATTORNEYS

UNITED STATES PATENT OFFICE.

THOMAS L. RINEY, OF CENTER, MISSOURI, AND JOHN A. RINEY, OF WYMORE, NEBRASKA.

LAMP ATTACHMENT FOR VEHICLES.

972,573.  Specification of Letters Patent. Patented Oct. 11, 1910.

Application filed May 15, 1909. Serial No. 496,132.

*To all whom it may concern:*

Be it known that we, THOMAS L. RINEY and JOHN A. RINEY, both citizens of the United States, and residents, respectively, of Center, in the county of Ralls and State of Missouri, and Wymore, in the county of Gage and State of Nebraska, have jointly invented a new and Improved Lamp Attachment for Vehicles, of which the following is a full, clear, and exact description.

The purpose of our invention is to provide novel means for detachably securing a lamp or lantern on the tip end of a vehicle tongue or draft pole, and thus dispose the lighting device in front of a team of draft animals that are connected with the tongue, whereby the light from the lamp or lantern will be projected forwardly and near the ground and illuminate the roadway directly in front of the horses, so that the driver may inspect the road before it is traversed and avoid defective portions or obstacles thereon.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1:
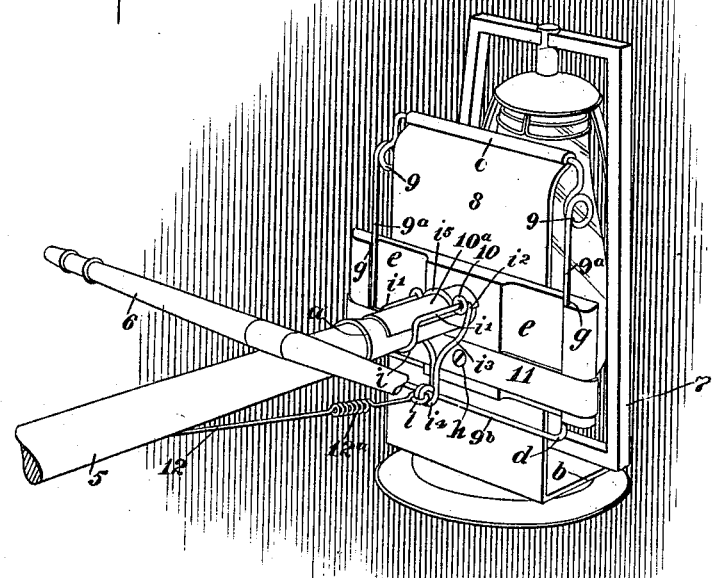
Figure 2:
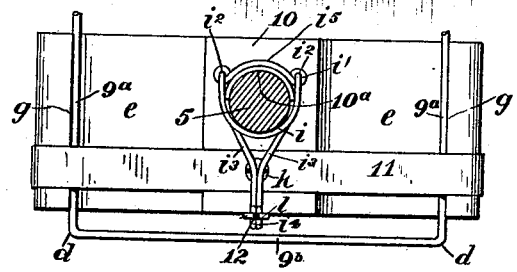
Figure 3:
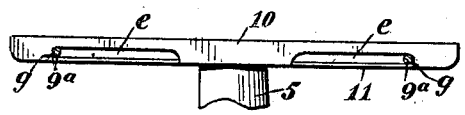
Figure 4:
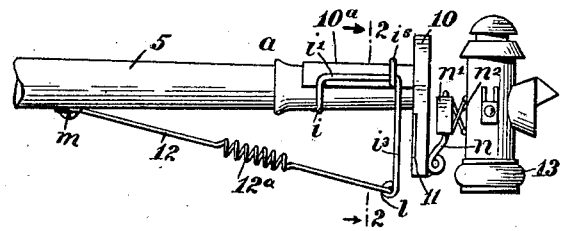

Figure 1 is a perspective view, showing a lantern, the forward portion of a draft pole of a vehicle, and the improved device applied for detachably connecting the lantern with the draft pole; Fig. 2 is an enlarged transverse sectional view, substantially on the line 2—2 in Fig. 4; Fig. 3 is a top edge view of the detail shown in Fig. 2, parts being removed; and Fig. 4 is a side view of a draft pole broken away rearward, and of the improvement thereon, showing a bicycle lamp connected with the pole by details of the connecting device.

In the drawings, 5 indicates a vehicle pole or tongue such as are provided for a passenger conveyance or the like, the rounded body of the pole at its front end having a ferrule *a* mounted and secured thereon, and rearward of the ferrule *a* a spreader bar or neck yoke 6 is mounted and secured transversely on the pole 5.

In Fig. 1, 7 indicates a lantern of well-known construction, whereon a reflector plate 8 is mounted, said plate being bent forward at the lower end and attached to the base of the lamp frame, as represented in Fig. 1 at *b*.

In a transverse tubulation *c* at the upper end of the reflector plate 8, the upper cross bar of a guide frame is secured, said frame which is preferably formed of resilient wire, being bent at each side edge of the reflector plate and near the tubulation *c*, so as to produce two spring coils 9, 9, from which downwardly extend two guide rods $9^a$, $9^a$. The guide rods $9^a$ are disposed parallel with each other and terminate in right angular bends *d*, a short distance above the lower end of the reflector plate 8, one of said bends appearing in Fig. 1 and both in Fig. 2, and as shown, the bends *d* are connected by an integral lower cross bar $9^b$, whereby the guide rods are spaced apart at their lower ends.

Upon the front end of the pole 5, a yoke plate 10 is detachably connected, said plate consisting of a metal cross bar that is flat on its front side and has parallel upper and lower edges, the length of said yoke plate being greater than the width of the reflector plate 8.

At the longitudinal center and on the rear side of the yoke plate 10, an arm $10^a$ is secured by one end thereof, and thence projects at a right angle thereto, said arm having a concave lower side that in service is seated upon the ferrule *a*. In the rear side of the yoke plate 10 and at an equal distance from its ends, two flat-bottomed recesses *e*, *e*, are formed that terminate at their outer ends in concaved shoulders *g*. The space between the shoulders *g* is slightly less than the distance between the guide rods $9^a$, and as the latter are resilient, the yoke plate 10 may be connected with said guide rods by an engagement of the concaved shoulders *g* respectively with the guide rods, as is clearly shown in Fig. 3.

Upon the yoke plate 10, near the lower edge thereof, a flat, thin keeper spring 11 is secured by a screw *h* that engages the yoke plate 10 at its longitudinal center, the ends thereof being bent so as to have a hooked engagement with the respective ends of the yoke plate, and it will be seen that when the guide rods $9^a$ are engaged with the shoulders $g$, the tension of the keeper spring 11 will retain the yoke plate in engagement therewith.

A clamping device for holding the arm $10^a$ seated upon the ferrule $a$ comprises the following details: A cradle, preferably bent into shape from wire rod material, is looped at its rear end so as to produce a concave member $i$ from which two parallel members $i'$ extend forwardly. The cradle members $i'$ terminate at their forward ends in right angular bends $i^2$, from which two similar arms $i^3$ project downward and toward each other, their lower ends terminating in ring eyes $i^4$ that have lateral contact with each other. At the bends $i^2$, hooks on the ends of an arched tie band $i^5$ are secured, this member completing the cradle. On the lapped ring eyes $i^4$, the front looped end $l$ of a brace rod 12 is secured and thence extends rearward, having a ring eye $m$ formed in the rear end, which is secured on the lower side of the pole, as shown in Fig. 4. A coiled spring $12^a$ is formed integrally with the brace rod 12, and by its contraction serves to clamp the arm $10^a$ forcibly upon the ferrule $a$.

It will be seen that the construction and relative arrangement of details, as hereinbefore described, serves to detachably secure the lantern 7 upright upon the front end of the tongue or draft pole 5, so that light, forwardly-reflected by the reflector plate 8, will be displayed in front of the team of draft animals hitched to the pole and clearly illuminate the roadbed over which the vehicle having the pole is to be drawn by the team. It will also be noted that the lantern may be readily detached from the pole 5 by releasing the guide rods $9^a$ from the yoke plate 10 and keeper spring 11, which may be quickly effected by a rearward movement of the lantern, which will remove the guide rods from the shoulders $g$ and press rearward the ends of the keeper spring.

In Fig. 4 a bicycle lamp 13 is shown as connected with the yoke plate 10 and a pole 5. To this end an upright arm $n$ is secured by the lower end thereof upon the front side of the yoke plate 10 and is spaced therefrom. Upon the lamp 13, a socket box $n'$ is secured by braces $n^2$ and thus disposed vertically, said box receiving the upright arm $n$ when the lamp 13 is placed in position for service, said lamp that is held from displacement by suitable means, being adapted to illuminate a road in front of a vehicle that is drawn by a team hitched to the pole 5.

Having thus described our invention, we claim as new and desire to secure by Letters Patent:

1. The combination with a vehicle pole, a lantern, and a reflector plate on said lantern, of vertical and parallel guide rods carried by the reflector plate, a yoke plate detachably secured to the end of the pole, and means for detachably securing the guide rods in engagement with the yoke plate.

2. The combination with a vehicle pole, a lighting device, and a reflector plate on said device, of two resilient guide rods disposed parallel with each other at the side edges of the reflector plate, a yoke plate on the pole, having recesses therein that receive the guide rods, and a plate spring on the yoke plate which engages with the guide rods when they are seated in the recesses.

3. The combination with a vehicle pole, and a yoke plate having an arm that seats on the end portion of the pole, of means for clamping the arm on the pole, comprising a cradle bent from a wire rod and having a depending loop at one end, side members extended forward from the loop member, an arched tie band at the forward ends of the side members and seating on the arm, downwardly-extending arms on said forward ends of the side members, and a brace rod embodying a coiled spring and connecting the lower ends of depending arms with the lower side of the pole.

4. In a lamp attachment for vehicles, a plate having a concave member projecting from its rear face to fit upon a vehicle pole, means for detachably securing the said member to the pole, a lantern, a member carried by the lantern at the rear thereof and an interlocking connection between the said member and plate, whereby the lantern will be held on the front face of said plate.

5. In a lamp attachment for vehicles, a plate having oppositely disposed shoulders on one face, means whereby the plate may be secured to the end of a vehicle pole, and a lantern having spaced spring rods with which the shoulders of the said plate engage.

6. In a lamp attachment for vehicles, a lantern having spaced spring rods, a plate having interlocking engagement with the rods of the lantern, means whereby the plate may be secured to the end of a vehicle pole, and a keeper secured to the said plate and extending over the spring rods.

THOMAS L. RINEY.
JOHN A. RINEY.

Witnesses to the signature of Thomas L. Riney:
C. C. WOOLDRIDGE,
E. A. KEITHLY.

Witnesses to the signature of John A. Riney:
W. H. SALISBURY,
CARL WORLEY.